US011224018B2

(12) United States Patent
Lee et al.

(10) Patent No.: US 11,224,018 B2
(45) Date of Patent: Jan. 11, 2022

(54) ELECTRONIC DEVICE AND METHOD FOR REDUCING CURRENT CONSUMPTION OF ELECTRONIC DEVICE IN NEAR FIELD WIRELESS COMMUNICATION USING SAME

(71) Applicant: Samsung Electronics Co., Ltd., Gyeonggi-do (KR)

(72) Inventors: Seungjae Lee, Gyeonggi-do (KR); Jungkuk Seo, Gyeonggi-do (KR); Jongmin Choi, Gyeonggi-do (KR); Sungjun Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/969,218

(22) PCT Filed: Feb. 14, 2019

(86) PCT No.: PCT/KR2019/001803
§ 371 (c)(1),
(2) Date: Aug. 12, 2020

(87) PCT Pub. No.: WO2019/164178
PCT Pub. Date: Aug. 29, 2019

(65) Prior Publication Data
US 2020/0413342 A1    Dec. 31, 2020

(30) Foreign Application Priority Data
Feb. 23, 2018   (KR) .................. 10-2018-0022081

(51) Int. Cl.
*H04W 52/02*   (2009.01)
*H04W 4/80*    (2018.01)
*H04W 88/04*   (2009.01)

(52) U.S. Cl.
CPC ......... *H04W 52/0241* (2013.01); *H04W 4/80* (2018.02); *H04W 52/0248* (2013.01); *H04W 52/0261* (2013.01); *H04W 88/04* (2013.01)

(58) Field of Classification Search
CPC ...................... H04W 52/0241; H04W 52/0261
See application file for complete search history.

(56) References Cited

U.S. PATENT DOCUMENTS

| 2011/0134832 A1 | 6/2011 | Soliman |
| 2016/0100369 A1 | 4/2016 | Chhabra |

(Continued)

FOREIGN PATENT DOCUMENTS

| KR | 10-2013-0039268 A | 4/2013 |
| KR | 10-2017-0069917 A | 6/2017 |

(Continued)

*Primary Examiner* — Tuan H Nguyen
(74) *Attorney, Agent, or Firm* — Cha & Reiter, LLC

(57) ABSTRACT

An electronic device according to various embodiments of the present invention comprises: a near field communication module; a memory; and a processor electrically connected to the near field communication module and the memory, wherein the processor may be configured to: monitor a status of the electronic device and a connection status of at least one external electronic device to the electronic device when the electronic device operates as a wireless router through the near field communication module; set the near field communication module to enter one of a plurality of predefined operating states based at least in part on the monitoring result; and set the near field communication module to enter a power saving mode when connection or disconnection of the at least one external electronic device is not detected for a predetermined time in the set one operating state. Other various embodiments, other than the various embodiments disclosed in the present invention, are possible.

15 Claims, 10 Drawing Sheets

(56) References Cited

U.S. PATENT DOCUMENTS

| | | | |
|---|---|---|---|
| 2017/0160089 A1* | 6/2017 | Jang | H04W 4/029 |
| 2018/0041349 A1 | 2/2018 | Jung et al. | |
| 2018/0338336 A1 | 11/2018 | Seo et al. | |
| 2018/0359017 A1 | 12/2018 | Kwon et al. | |
| 2019/0150093 A1 | 5/2019 | Kweon et al. | |

FOREIGN PATENT DOCUMENTS

| | | | | |
|---|---|---|---|---|
| KR | 10-2017-0094555 A | | 8/2017 | |
| KR | 20170094555 A | * | 8/2017 | H04W 48/16 |
| KR | 10-2017-0126695 A | | 11/2017 | |
| KR | 10-2018-0015037 A | | 2/2018 | |
| WO | 2017/086599 A1 | | 5/2017 | |
| WO | 2017/086656 A1 | | 5/2017 | |

* cited by examiner

ELECTRONIC DEVICE AND METHOD FOR REDUCING CURRENT CONSUMPTION OF ELECTRONIC DEVICE IN NEAR FIELD WIRELESS COMMUNICATION USING SAME

CROSS REFERENCE TO RELATED APPLICATIONS

This application is a National Phase Entry of PCT International Application No. PCT/KR2019/001803, which was filed on Feb. 14, 2019, and claims a priority to Korean Patent Application No. 10-2018-0022081, which was filed on Feb. 23, 2018, the contents of which are incorporated herein by reference.

TECHNICAL FIELD

Various embodiments of the disclosure relate to an electronic device and a method for reducing current consumption of an electronic device by using the same in near field wireless communication.

BACKGROUND ART

Recently, as the number and types of electronic devices possessed by individuals increase, the use of a mobile hotspot function via Wi-Fi increases. The mobile hotspot function is intended to support effective network mobility, and based on an access point (AP) technology of Wi-Fi, an electronic device may function as a wireless router such as a Wi-Fi hotspot to allow external electronic devices, whose accesses are allowed, to use the wireless internet.

DISCLOSURE OF INVENTION

Technical Problem

When an electronic device operates as a mobile hotspot, since the electronic device operates only by means of a battery, the current consumption due to the use of the battery may be greater than that of a Wi-Fi wireless router (AP) connected to a power source. For example, when the electronic device operates as a mobile hotspot, a reception module of Wi-Fi may be maintained to be on, so as to always receive a data packet, a search packet, and a connection packet from an external electronic device connected to the electronic device. Accordingly, since the electronic device allows the reception module to be maintained to be on even when there is no packet transmitting/receiving between the electronic device and the external electronic device, the current consumption thereof may be high.

When an electronic device according to various embodiments of the disclosure operates as a wireless router (for example, a mobile hotspot), the electronic device may monitor a state of the electronic device and whether an external electronic device is connected thereto, and, when the external electronic device is not connected to the electronic device for a predetermined time, perform control such that a wireless communication module enters a power saving mode.

An electronic device according to various embodiments of the disclosure may monitor a packet transmitting/receiving state with external electronic devices connected thereto through a wireless router (for example, a mobile hotspot) and thus adjust a time for which a sleep state lasts in a power saving mode.

Solution to Problem

According to various embodiments of the disclosure, an electronic device includes a near field communication module, a memory, and a processor electrically connected to the near field communication module and the memory, wherein the processor may: monitor a state of the electronic device and a connection state between the electronic device and at least one external electronic device when the electronic device operates as a wireless router by means of the near field communication module; configure the near field communication module to enter one operation state among a plurality of predefined operation states, based on at least a part of a result of the monitoring; and configure the near field communication module to enter a power saving mode when, in the one configured operation state, connection or disconnection of the at least one external electronic device is not detected for a predefined time.

According to various embodiments of the disclosure, a method for reducing current consumption of an electronic device in near field wireless communication may include: monitoring a state of the electronic device and a connection state between the electronic device and at least one external electronic device when the electronic device operates as a wireless router by means of a near field communication module; configuring the near field communication module to enter one operation state among a plurality of predefined operation states, based on at least a part of a result of the monitoring; and configuring the near field communication module to enter a power saving mode when, in the one configured operation state, connection or disconnection of the at least one external electronic device is not detected for a predefined time.

Advantageous Effects of Invention

An electronic device according to various embodiments of the disclosure may monitor a state of the electronic device and whether an external electronic device is connected thereto, when the electronic device operates in a wireless router mode, and, based on a result of the monitoring, configure a reception module (RX module) of Wi-Fi to enter a power saving mode in which the reception module is controlled to be off. As the reception module enters the power saving mode, the current consumed due to the use of a battery may be reduced.

According to various embodiments of the disclosure, an electronic device, which operates in a wireless router mode by using an existing chip-set, may enter a sleep section in a power saving mode even without any new change related to a communication chip-set. Accordingly, the compatibility with a previously released model may be maintained.

An electronic device according to various embodiments of the disclosure may monitor packet transmitting/receiving states with external electronic devices connected thereto through a mobile hotspot, in a power saving mode which the electronic device enters while performing a mobile hotspot function, and thus adjust an interval of a sleep section. As the interval of the sleep section is adjusted based on a result of the monitoring of the packet transmitting/receiving states, not only the current consumption of the electronic device can be prevented, but also the performance degradation of the mobile hotspot can be prevented.

MODE FOR THE INVENTION

Figure 1:
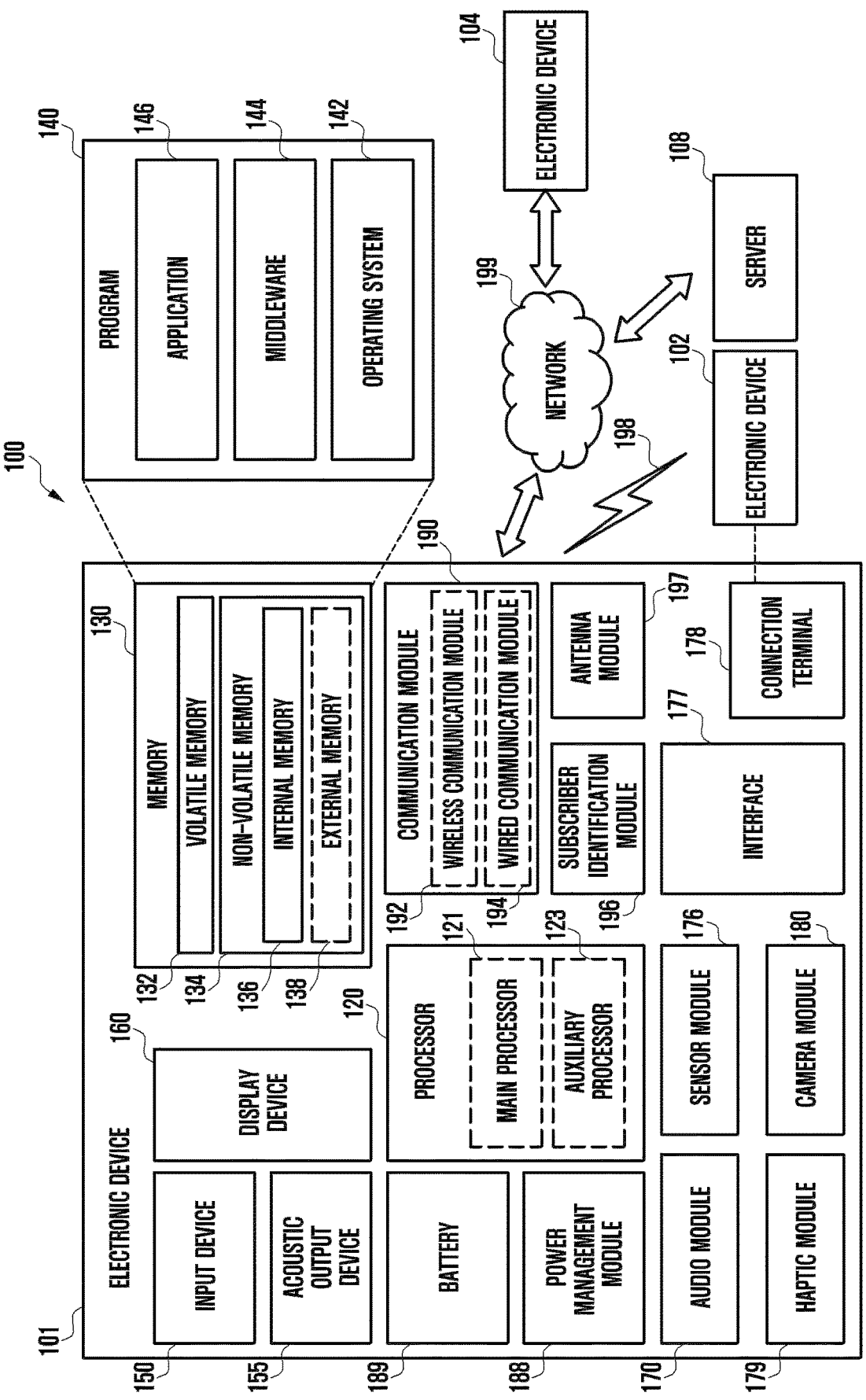
FIG. 1 is a block diagram of an electronic device in a network environment, according to various embodiments.

FIG. 1 is a block diagram of an electronic device in a network environment, according to various embodiments.

Referring to FIG. 1, the electronic device 101 in the network environment 100 may communicate with an electronic device 102 via a first network 198 (e.g., a short-range wireless communication network), or an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input device 150, a sound output device 155, a display device 160, an audio module 170, a sensor module 176, an interface 177, a haptic module 179, a camera module 180, a power management module 188, a battery 189, a communication module 190, a subscriber identification module (SIM) 196, or an antenna module 197. In some embodiments, at least one (e.g., the display device 160 or the camera module 180) of the components may be omitted from the electronic device 101, or one or more other components may be added in the electronic device 101. In some embodiments, some of the components may be implemented as single integrated circuitry. For example, the sensor module 176 (e.g., a fingerprint sensor, an iris sensor, or an illuminance sensor) may be implemented as embedded in the display device 160 (e.g., a display).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may load a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), and an auxiliary processor 123 (e.g., a graphics processing unit (GPU), an image signal processor (ISP), a sensor hub processor, or a communication processor (CP)) that is operable independently from, or in conjunction with, the main processor 121. Additionally or alternatively, the auxiliary processor 123 may be adapted to consume less power than the main processor 121, or to be specific to a specified function. The auxiliary processor 123 may be implemented as separate from, or as part of the main The auxiliary processor 123 may control at least some of functions or states related to at least one component (e.g., the display device 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input device 150 may receive a command or data to be used by other component (e.g., the processor 120) of the electronic device 101, from the outside (e.g., a user) of the electronic device 101. The input device 150 may include, for example, a microphone, a mouse, a keyboard or a digital pen (e.g., a stylus pen).

The sound output device 155 may output sound signals to the outside of the electronic device 101. The sound output device 155 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 160 may visually provide information to the outside (e.g., a user) of the electronic device 101. The display device 160 may include, for example, a display, a hologram device, or a projector and control circuitry to control a corresponding one of the display, hologram device, and projector. According to an embodiment, the display device 160 may include touch circuitry adapted to detect a touch, or sensor circuitry (e.g., a pressure sensor) adapted to measure the intensity of force incurred by the touch.

The audio module 170 may convert a sound into an electrical signal and vice versa. According to an embodiment, the audio module 170 may obtain the sound via the input device 150, or output the sound via the sound output device 155 or a headphone of an external electronic device (e.g., an electronic device 102) (e.g., speaker or headphone) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) (e.g., a wireless transceiver) or a wired communication module 194 (e.g., a local area network (LAN) communication module or a power line communication (PLC) module) (e.g., a wired transceiver). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a cellular network, the Internet, or a computer network (e.g., local area network (LAN) or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The antenna module 197 may transmit or receive a signal or power to or from the outside (e.g., the external electronic device) of the electronic device 101. According to an embodiment, the antenna module 197 may include a plurality of antennas. In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 and 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, or client-server computing technology may be used, for example.

Figure 2:
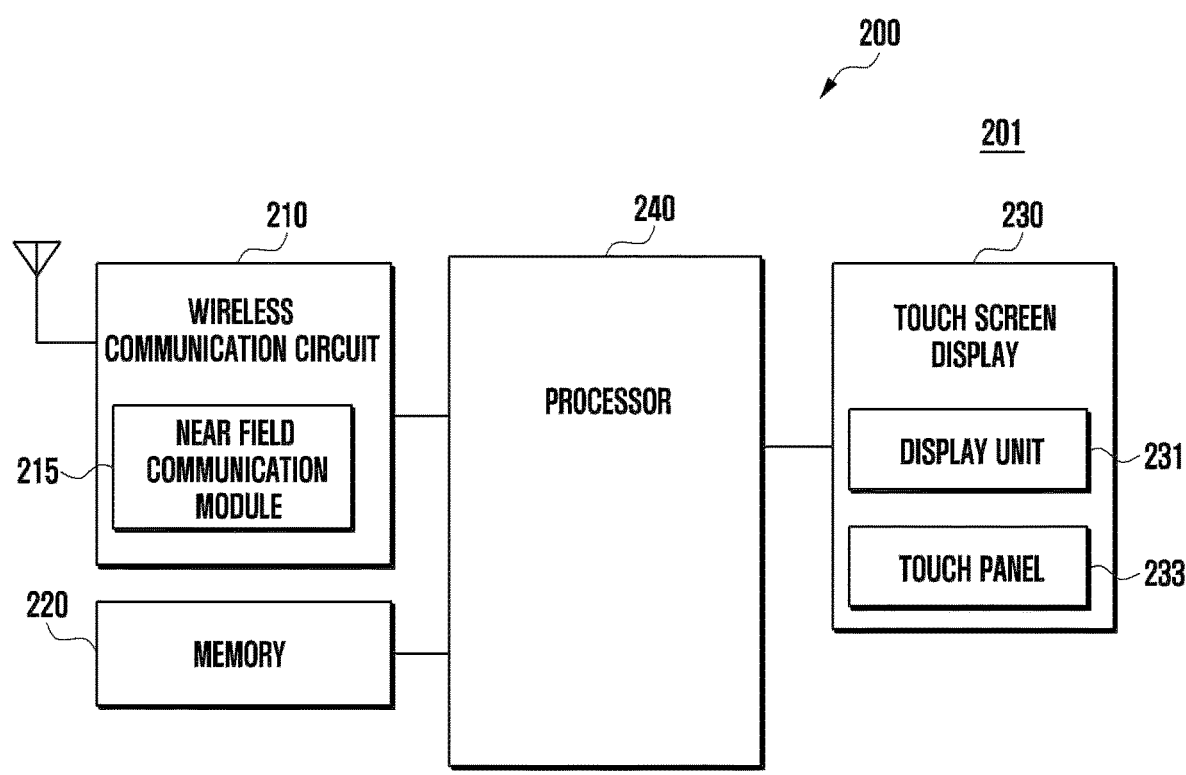
FIG. 2 is a block diagram illustrating an electronic device according to various embodiments of the disclosure.

FIG. 2 is a block diagram 200 illustrating an electronic device 201 according to various embodiments of the disclosure.

Referring to FIG. 2, the electronic device 201 (for example, the electronic device 101 of FIG. 1) may include: a wireless communication circuit 210 (for example, the communication module 190 of FIG. 1); a memory 220 (for example, the memory 130 of FIG. 1); a touch screen display 230 (for example, the display device 160 of FIG. 1); and a processor 240 (for example, the processor 120 of FIG. 1).

According to various embodiments of the disclosure, the wireless communication circuit 210 may perform communication between the electronic device 201 and an external electronic device (for example, the electronic device 102, the electronic device 104, and the server 108 of FIG. 1).

According to one embodiment, the wireless communication circuit 210 may include a near field communication module 215 (for example, the first network 198 of FIG. 1). For example, the near field communication module 215 may include a near field communication network such as Bluetooth, Wi-Fi direct, or an infrared data association (IrDA).

According to one embodiment, the near field communication module 215 may support a mobile hotspot. When a mobile hotspot function is activated by means of the near field communication module 215 under the control of the processor 240, the electronic device 201 may operate as a wireless router.

According to various embodiments of the disclosure, the memory 220 may include a program memory (not shown) for storing an operation program of the electronic device 201 and a data memory (not shown) for storing data such as an object, contents, log information, and the like, which are generated during program execution.

According to one embodiment, the memory 220 may store a program for controlling an entry of the near field communication module 215 into a power saving mode and a plurality of operation states, based on at least one of a state of the electronic device 201 and whether at least one external electronic device is connected to the electronic device. In the power saving mode of the near field communication module 215, the memory 220 may store a program in which, in a power saving mode, the near field communication module 215 adjusts a time for which a sleep state of the near field communication module 215 lasts, based on a packet transmitting/receiving state with the at least one external electronic device. For example, the memory 220 may store a mapping table (for example, a table to which at least one reference value and a sleep duration time are mapped) with respect to at least one parameter (for example, RX multicast, RX retransmission, the total packet, and/or retransmission for each service category) which is the basis for adjusting a time for which the sleep state lasts.

According to various embodiments of the disclosure, the touch screen display 230 may be integrally constituted by a display unit 231 and a touch panel 233.

According to one embodiment, the touch screen display 230 may display a user interface for activating a mobile hotspot function such that the electronic device 201 operates as a wireless router under the control of the processor 240. Under the control of the processor 240, the touch screen display 230 may display a tethering request message received from at least one external electronic device. Under the control of the processor 240, the touch screen display 230 may display a user interface for accepting or rejecting the tethering request in response to the tethering request. Under the control of the processor 240, the touch screen display 230 may display a list of at least one external electronic device connected to the electronic device 201 which operates as a wireless router.

According to one embodiment, under the control of the processor 240, the touch screen display 230 may display an indicator (for example, an icon) which indicates an entry of the near field communication module 215 into a power saving mode and an operation state. The touch screen display 230 may display a user interface for deactivating a mobile hotspot function, under the control of the processor 240.

According to various embodiments of the disclosure, the processor 240 may control the entire operation of the electronic device 201 and a signal flow between internal elements of the electronic device 201, perform data processing, and control power supply from a battery (for example, the battery 189 of FIG. 1) to the elements.

According to one embodiment, the processor 240 may configure the electronic device 201 to operate as a wireless router through the near field communication module 215. For example, the near field communication module 215 may support a mobile hotspot.

According to one embodiment, the processor 240 may monitor a state of the electronic device 201 and a connection state between at least one external electronic device and the electronic device 201 which operates as a wireless router. The processor 240 may configure the near field communication module 215 to enter one operation state among a plurality of predefined operation states, based on at least a part of a result of the monitoring. For example, the plurality of predefined operation states may include a first operation state, a second operation state, and a third operation state. The processor 240 may configure the near field communication module 215 to enter one operation state among the first operation state, the second operation state, and the third operation state, based on at least one of whether the electronic device 201 is connected to a power source and whether at least one external electronic device is connected to or the connected external electronic device is disconnected from the electronic device 201 which operates as a wireless router.

According to one embodiment, when connection or disconnection between at least one external electronic device and the electronic device 201, which operates as a wireless router, is not detected for a predefined time, the processor 240 may configure the near field communication module 215 to enter a power saving mode, based on at least a part of a result of the monitoring.

According to one embodiment, the processor 240 may monitor a packet transmitting/receiving state with at least one external electronic device connected to the electronic device 201 which operates as a wireless router in a power saving mode. For example, the processor 240 may measure at least one of the number of multicast packets, the number of retransmission packets, the total number of packets, or the number of retransmission packets for each service category, which are received from the at least one connected external electronic device. The processor 240 may adjust a time for which a sleep state of the near field communication module 215 lasts, based on at least a part of a result of the monitoring of the packet transmitting/receiving state.

Figure 3:
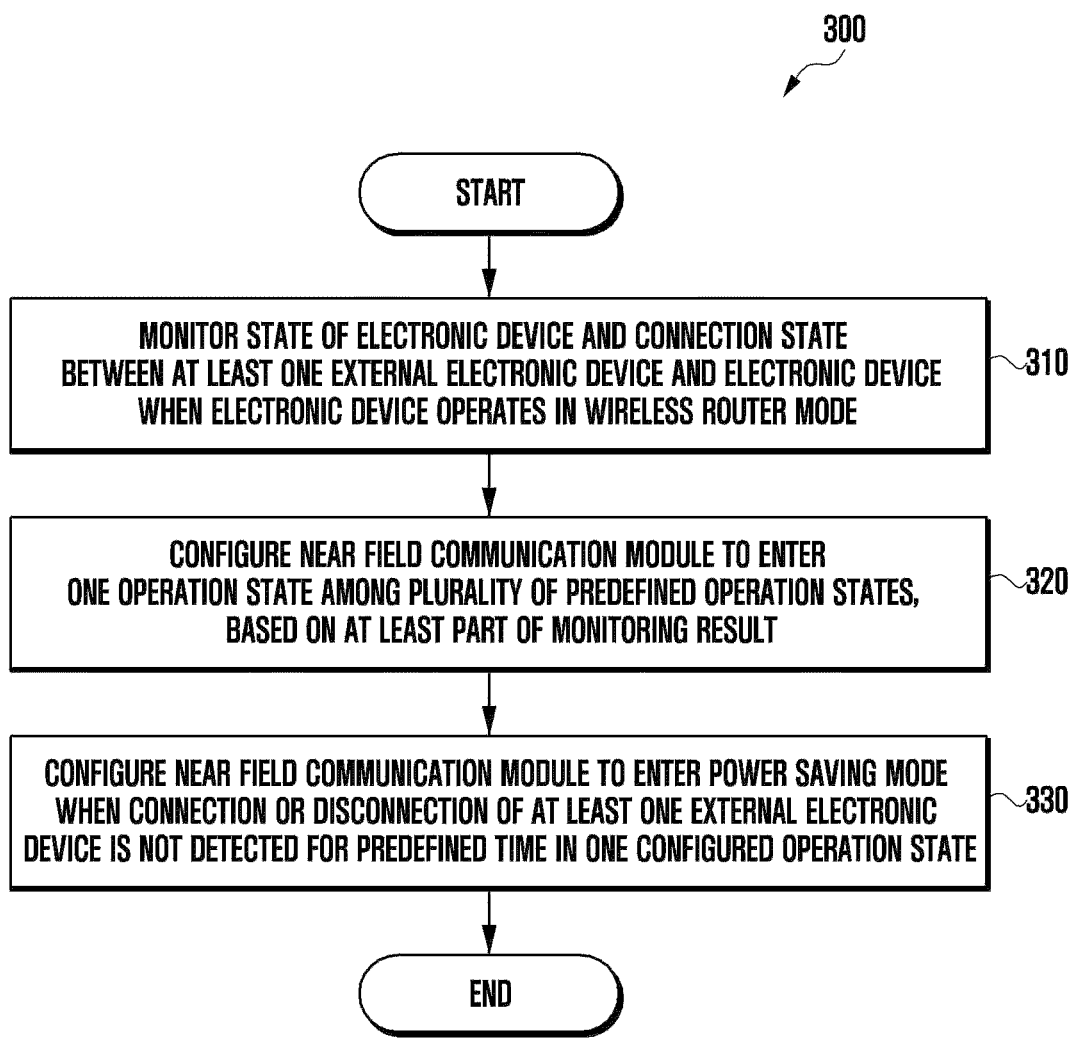
FIG. 3 is a flowchart illustrating a method of configuring an operation state of a near field communication module when an electronic device performs near field wireless communication, according to various embodiments of the disclosure.

FIG. 3 is a flowchart 300 illustrating a method of configuring an operation state of a near field communication module when an electronic device performs near field wireless communication, according to various embodiments of the disclosure.

Referring to FIG. 3, in operation 310, when an electronic device (for example, the electronic device 201 of FIG. 2) operates as a wireless router through a near field communication module (for example, the near field communication module 215 of FIG. 2), a processor (for example, the processor 240 of FIG. 2) may monitor a state of the electronic device and a connection state between at least one external electronic device (for example, the electronic device 102 or 104 and the server 108 of FIG. 1) and the electronic device which operates in a wireless router mode.

According to one embodiment, the near field communication module may support a mobile hotspot.

In one embodiment, as a mobile hotspot function is turned on (for example, activated), the electronic device may operate as a wireless router. For example, the electronic device may operate as a host of a mobile hotspot, and at least one external electronic device connected to the electronic device may operate as a client of the mobile hotspot.

In one embodiment, in operation 320, the processor may configure the near field communication module to enter one operation state among a plurality of predefined operation states, based on at least a part of a result of the monitoring.

In one embodiment, the plurality of predefined operation states may include a first operation state, a second operation state, and a third operation state.

In one embodiment, the processor may configure the near field communication module to enter one operation state among the plurality of predefined operation states, such as the first operation state, the second operation state, and the third operation state, based on at least one of whether the electronic device is connected to a power source and whether at least one external electronic device is connected to or the connected external electronic device is disconnected from the electronic device which operates as a wireless router.

In one embodiment, in operation 330, when connection or disconnection between the at least one external electronic device and the electronic device which operates as a wireless router is not detected for a predefined time in the one configured operation state among the plurality of predefined operation states, the processor may configure the near field communication module to enter a power saving mode.

In one embodiment, as the near field communication module is configured to enter a power saving mode, a reception module of the near field communication module is not required to be maintained to be on, and thus the current consumption of the electronic device can be prevented.

In one embodiment, the plurality of predefined operation states and the power saving mode will be described in detail in FIG. 4.

Figure 4:
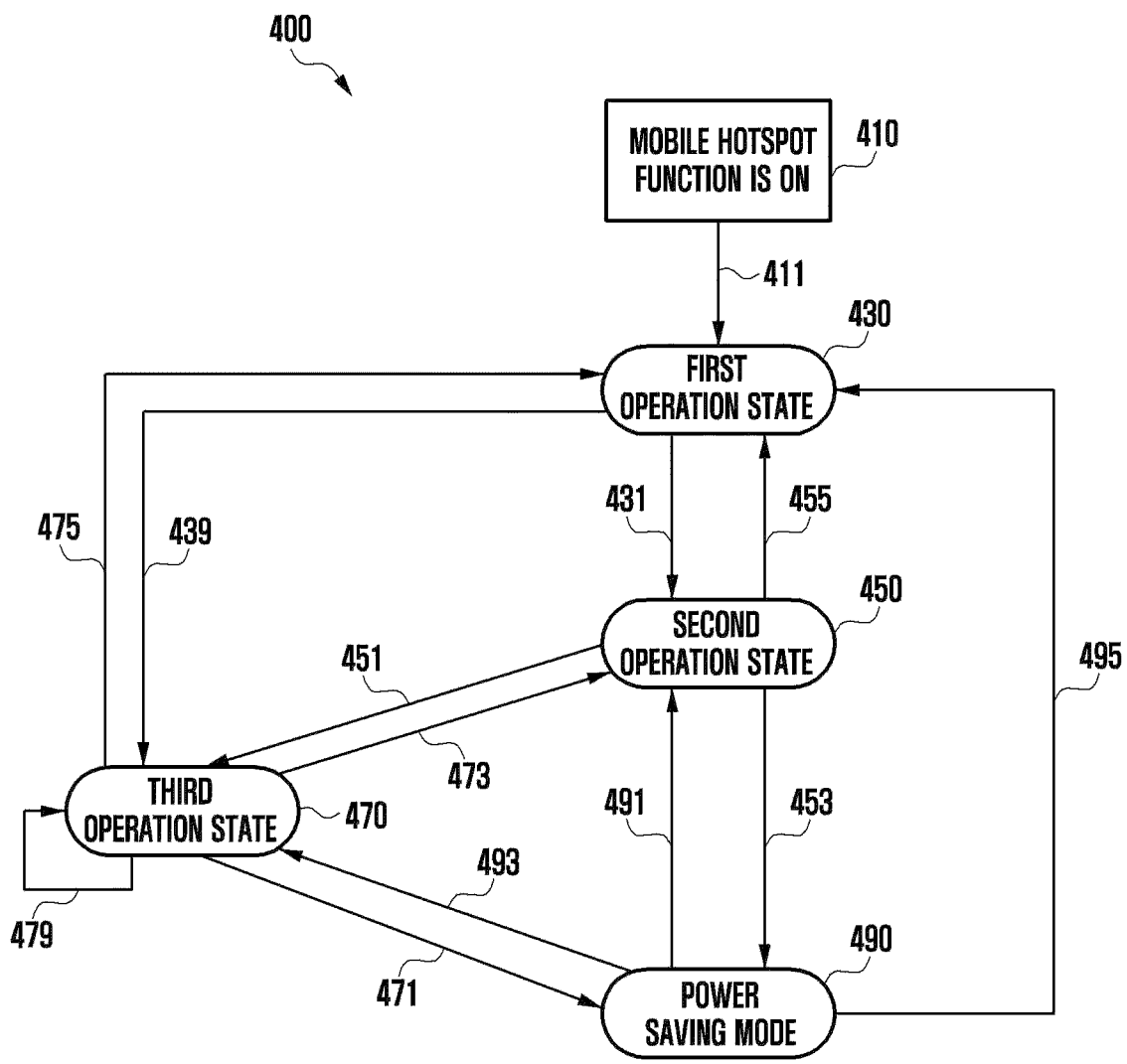
FIG. 4 is a diagram illustrating a signal flow for configuring an operation state of a near field communication module when an electronic device performs near field wireless communication, according to various embodiments of the disclosure.

FIG. 4 is a diagram 400 illustrating a signal flow for configuring an operation state of a near field communication module when an electronic device performs near field wireless communication, according to various embodiments of the disclosure.

Referring to FIG. 4, a processor (for example, the processor 240 of FIG. 2) may perform control such that an electronic device (for example, the electronic device 201 of FIG. 2) operates as a wireless router through a near field communication module (for example, the near field communication module 215 of FIG. 2).

In one embodiment, the near field communication module may support a mobile hotspot.

In one embodiment, when a mobile hotspot function is in an on-state 410, the electronic device may operate as a wireless router such as a mobile hotspot through the near field communication module.

In following embodiments, the electronic device can be described assuming that the electronic device operates as a mobile hotspot through the near field communication module.

In one embodiment, the processor may monitor a state of the electronic device and a connection state of at least one external electronic device (for example, the electronic device 102 or 104 and the server 108 of FIG. 1) connected to the electronic device which operates as a mobile hotspot.

In one embodiment, based on a result of the monitoring, when the electronic device is connected to a power source (operation 411), the processor may configure the near field communication module to enter a first operation state 430.

In one embodiment, based on the monitoring result, the processor may configure the near field communication module to enter a second operation state 450 when the electronic device is disconnected from the power source and connection between an external electronic device and the electronic device which operates as a mobile hotspot is not detected while the near field communication module is in the first operation state 430 (operation 431).

In one embodiment, based on the monitoring result, the processor may configure the near field communication module to enter a third operation state 470 when the electronic device is disconnected from the power source and at least one external electronic device is connected to the electronic device which operates as a mobile hotspot while the near field communication module is in the first operation state 430 (operation 439).

In one embodiment, based on the monitoring result, the processor may configure the near field communication module to enter the first operation state 430 when the electronic device is connected to the power source while the near field communication module is in the second operation state 450 (operation 455).

In one embodiment, based on the monitoring result, the processor may configure the near field communication module to enter a power saving mode 490 when additional connection between an external electronic device and the electronic device which operates as a mobile hotspot is not detected for a predefined time and there is no previously connected external electronic device while the near field communication module is in the second operation state 450 (operation 453).

In one embodiment, based on the monitoring result, the processor may configure the near field communication module to enter the third operation state 470 when at least one external electronic device is connected to the electronic device which operates as a mobile hotspot for a predefined time while the near field communication module is in the second operation state 450 (operation 451).

In one embodiment, based on the monitoring result, the processor may maintain the near field communication module in the third operation state 470 when at least one external electronic device is additionally connected to or the at least one connected external electronic device is disconnected from the electronic device while the near field communication module is in the third operation state 470 and the at least one external electronic device is maintained to be connected to the electronic device which operates as a mobile hotspot (operation 479).

In one embodiment, based on the monitoring result, the processor may configure the near field communication module to enter the second operation state 450 when near field communication connections of all of the external electronic devices connected to the electronic device which operates as a mobile hotspot are disconnected while the near field communication module is in the third operation state 470 (operation 473).

In one embodiment, based on the monitoring result, the processor may configure the near field communication module to enter the power saving mode 490 when at least one external electronic device is not additionally connected to or disconnected from the electronic device which operates as a mobile hotspot for a predefined time, or the number of external electronic devices currently connected to the electronic device is the same as the maximum number of connectable external electronic devices while the near field communication module is in the third operation state 470 (operation 471).

However, the disclosure is not limited thereto, and based on the monitoring result, the processor may configure the near field communication module to enter the power saving mode 490 when all of the external electronic devices, which allow connections to the electronic device, and the external electronic devices, each of which has an access record, are connected to the electronic device which operates as a mobile hotspot, while the near field communication module is in the third operation state 470.

In one embodiment, based on the monitoring result, the processor may configure the near field communication module to enter the first operation state 430 when the electronic device is connected to the power source while the near field communication module is in the third operation state 470 (operation 475).

In one embodiment, based on the monitoring result, the processor may configure the near field communication module to enter the second operation state 450 when near field communication connections of all of the external electronic devices connected to the electronic device which operates as a mobile hotspot are disconnected while the near field communication module is in the power saving mode 490 (operation 491).

In one embodiment, based on the monitoring result, the processor may configure the near field communication module to enter the third operation state 470 when at least one external electronic device is additionally connected to the electronic device or near field communication connection of the at least one external electronic device is disconnected while the near field communication module is in the power saving mode 490 and the at least one external electronic device is maintained to be connected to the electronic device which operates as a mobile hotspot (operation 493).

In one embodiment, based on the monitoring result, the processor may configure the near field communication module to enter the first operation state 430 when the electronic device which operates as a mobile hotspot is connected to the power source while the near field communication module is in the power saving mode 490 (operation 495).

In one embodiment, until an off-state of a mobile hotspot function is detected, the processor may monitor a state of the electronic device and a connection state between the electronic device and the at least one external electronic device, and based on a result of the monitoring, may repeatedly perform configuration operations such that the near field communication module enters one of the first operation state 430, the second operation state 450, the third operation state 470, and the power saving mode 490.

Figure 5:
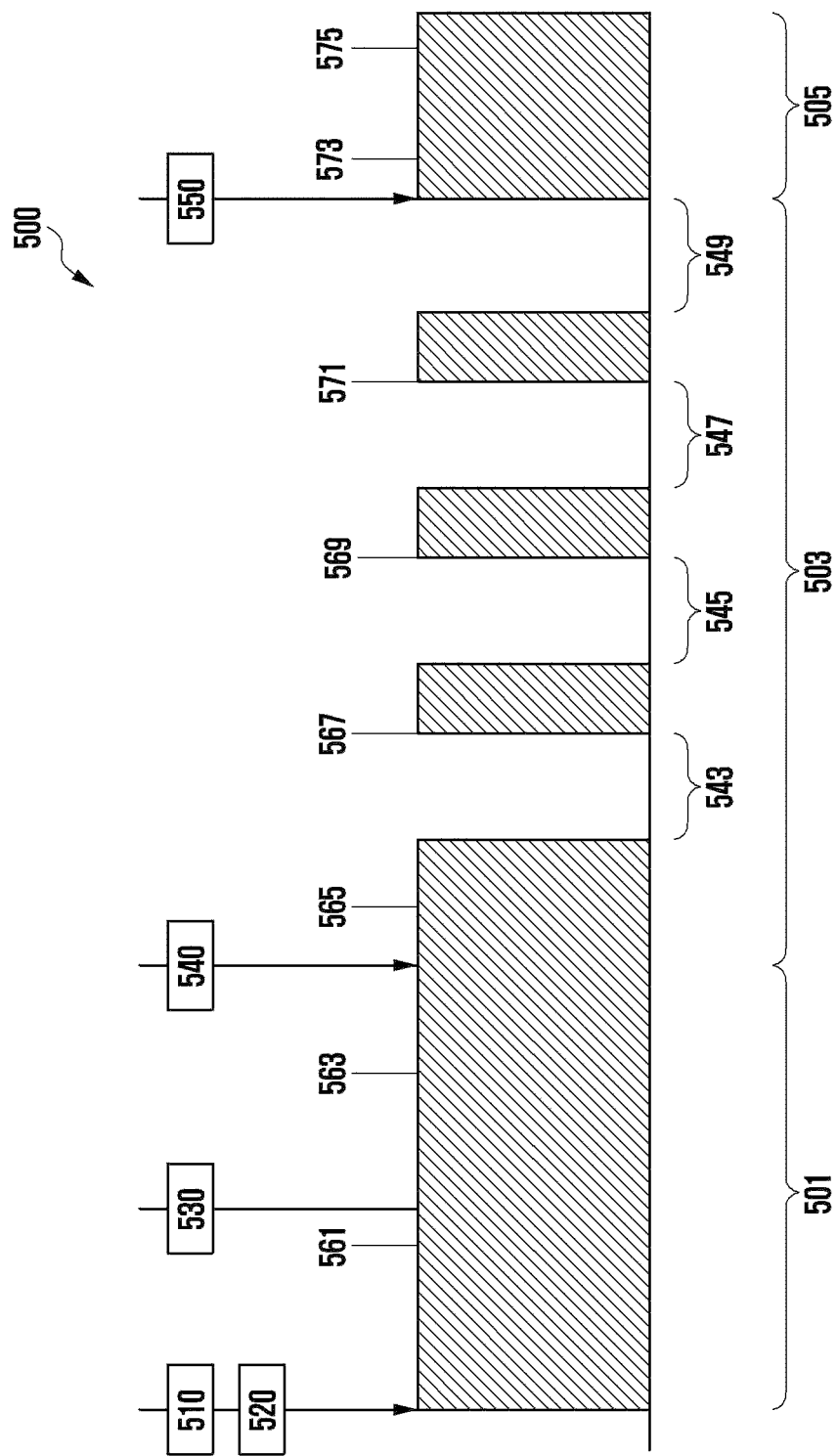
FIG. 5 is a diagram illustrating a method of controlling a reception (RX) module state of a near field communication module of an electronic device for each operation state of the near field communication module, according to various embodiments of the disclosure.

FIG. 5 is a diagram 500 illustrating a method of controlling a reception (RX) module state of a near field communication module of an electronic device for each operation state of the near field communication module, according to various embodiments of the disclosure.

Referring to FIG. 5, in an electronic device (for example, the electronic device 201 of FIG. 2) which operates as a mobile hotspot, a processor (for example, the processor 240 of FIG. 2) may transmit a beacon signal (operations 561, 563, 565, 567, 569, 571, 573, and 575) at a predefined time interval (for example, two seconds) in deactivation sections 501 and 505 and an activation section 503 of a sleep state while a near field communication module (for example, the near field communication module 215 of FIG. 2) operates in a power saving mode 540 (for example, the power saving mode 490 of FIG. 4). Upon transmitting a beacon signal (operations 561, 563, 565, 567, 569, 571, 573, and 575) at the predefined time interval, the processor may receive a tethering request message from at least one external electronic device (for example, the electronic device 102 or 104 and the server 108 of FIG. 1). In response to the tethering request, the processor may transmit, to the at least one external electronic device, a message for accepting or rejecting tethering.

In one embodiment, the processor may configure the near field communication module to enter a first operation state 510 (for example, the first operation state 430 of FIG. 4) when the electronic device is connected to a power source, after a mobile hotspot function is activated (for example, the on-state 410 of the mobile hotspot function of FIG. 4).

In one embodiment, when at least one external electronic device is not connected to the electronic device which operates as a mobile hotspot at a time when the electronic device is disconnected from the power source while the near field communication module is in the first operation state 510, the processor may configure the near field communication module to enter a second operation state 520 (for example, the second operation state 450 of FIG. 4).

In one embodiment, when the electronic device is disconnected from the power source and at least one external electronic device is connected to the electronic device which operates as a mobile hotspot at the time of the disconnection, the processor may configure the near field communication module to enter a third operation state 530 (for example, the third operation state 470 of FIG. 4).

In one embodiment, when additional connection between at least one external electronic device and the electronic device which operates as a mobile hotspot is not detected for a predefined time and there is no previously connected at least one external electronic device, the processor may configure the near field communication module to enter a power saving mode 540.

In one embodiment, after the near field communication module enters the power saving mode 540, the processor may perform control such that a reception (RX) module of the near field communication module (for example, Wi-Fi) is on, at a time when the processor transmits a beacon signal (operations 565, 567, 569, and 571) at the predefined time interval.

In one embodiment, after the near field communication module enters the power saving mode 540, the processor may perform control such that the reception (RX) module of the near field communication module is off (for example, a sleep state), at a time when the processor does not transmit the beacon signal (operations 543, 545, 547, and 549).

In one embodiment, Table 1 below shows comparison of consumed currents according to frequency bands in an idle state after at least one external electronic device is connected to the electronic device which operates as a mobile hotspot.

In one embodiment, Table 1 below is a comparative analysis table and shows results of experiments conducted under a condition configured such that, if mobile hotspot packets are maintained for a predetermined time, for example, seven seconds, at a rate of less than twenty packets per a second, while a reception (RX) module of a near field communication module (for example, Wi-Fi) is activated, 30% of the activated period is switched to a sleep section.

As illustrated in Table 1 below, as an electronic device according to various embodiments of the disclosure enters a power saving mode and then performs control such that a reception module of a near field communication module is deactivated (for example, an entry into a sleep section), it may be identified that the consumed current is reduced in comparison with the prior art.

TABLE 1

|  | The prior art (a power saving mode is off) | The disclosure (a power saving mode is on) | Improvement value (%) |
| --- | --- | --- | --- |
| Consumed current of 2.4 G MHS(mobile hotspot) | 65 mA | 47 mA | 28% |
| Consumed current of 5 G MHS | 117 mA | 83 mA | 30% |

In one embodiment, the processor may configure the near field communication module to enter a second operation state or a third operation state 550 (for example, the second operation state 520 and the third operation state 530) when at least one external electronic device is additionally connected to or the connected external electronic device is disconnected from the electronic device which operates as a mobile hotspot, after the near field communication module enters the power saving mode 540.

For example, the processor may configure the near field communication module to enter the third operation state when at least one external electronic device is additionally connected to or the connected external electronic device is disconnected from the electronic device while at least one external electronic device is maintained to be connected to the electronic device which operates as a mobile hotspot. When the at least one external electronic device is disconnected from the electronic device which operates as a mobile hotspot, and thus there is no more connected external electronic device, the processor may configure the near field communication module to enter the second operation state.

In one embodiment, after the power saving mode 540 is activated (the activation section 503), the processor performs control such that the reception (RX) module of the near field communication module is on, at a predefined time interval, and thus at least one new external electronic device may try to be connected to the electronic device through the mobile hotspot function even in the power saving mode 540.

Figure 6:
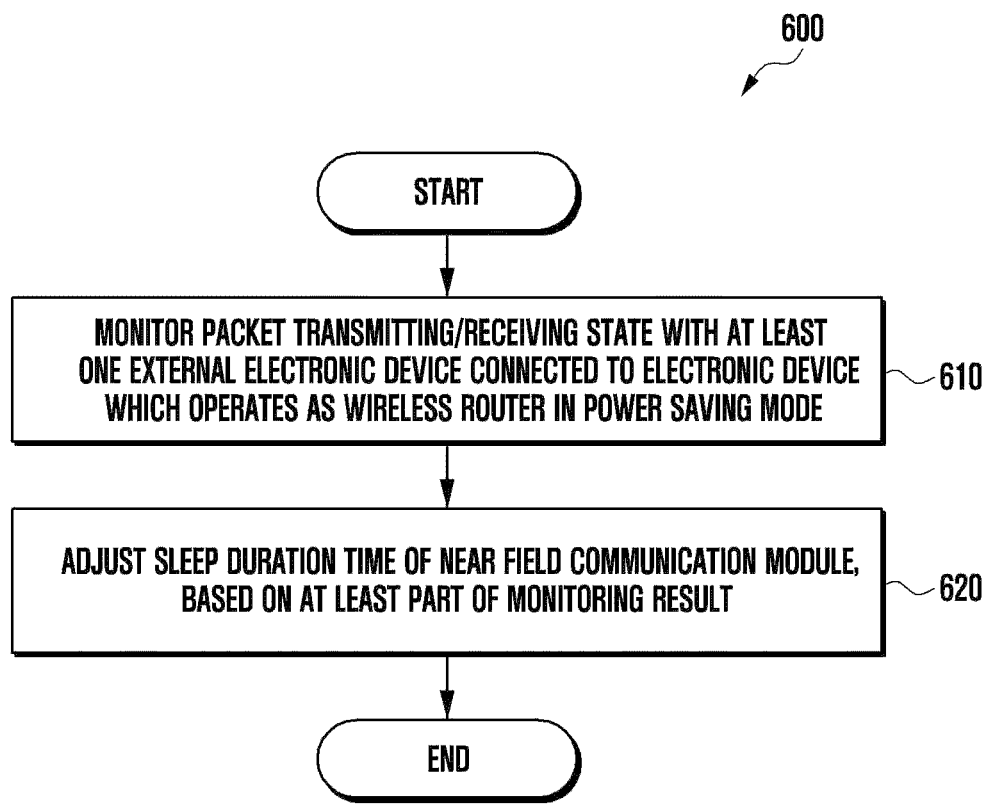
FIG. 6 is a flowchart illustrating a method of adjusting a time for which a sleep state of a near field communication module of an electronic device lasts while the near field communication module is in a power saving mode, according to various embodiments of the disclosure.

FIG. 6 is a flowchart 600 illustrating a method of adjusting a time for which a sleep state of a near field communication module of an electronic device lasts while the near field communication module is in a power saving mode, according to various embodiments of the disclosure.

Referring to FIG. 6, in operation 610, a processor (for example, the processor 240 of FIG. 2) may monitor a packet transmitting/receiving state with at least one external electronic device (for example, the electronic device 102 or 104 and the server 108 of FIG. 1) connected to an electronic device (for example, the electronic device 201 of FIG. 2) which operates as a wireless router in a power saving mode.

In one embodiment, in operation 620, the processor may adjust a sleep duration time of a near field communication module, based on at least a part of a result of the monitoring of the packet transmitting/receiving state.

In one embodiment, as the processor adjusts the sleep duration time of the near field communication module, based on at least a part of the monitoring result of the packet transmitting/receiving state, not only the current consumption of the electronic device can be prevented, but also the performance degradation of a near field wireless communication (for example, a mobile hotspot) can be prevented.

Figure 7:
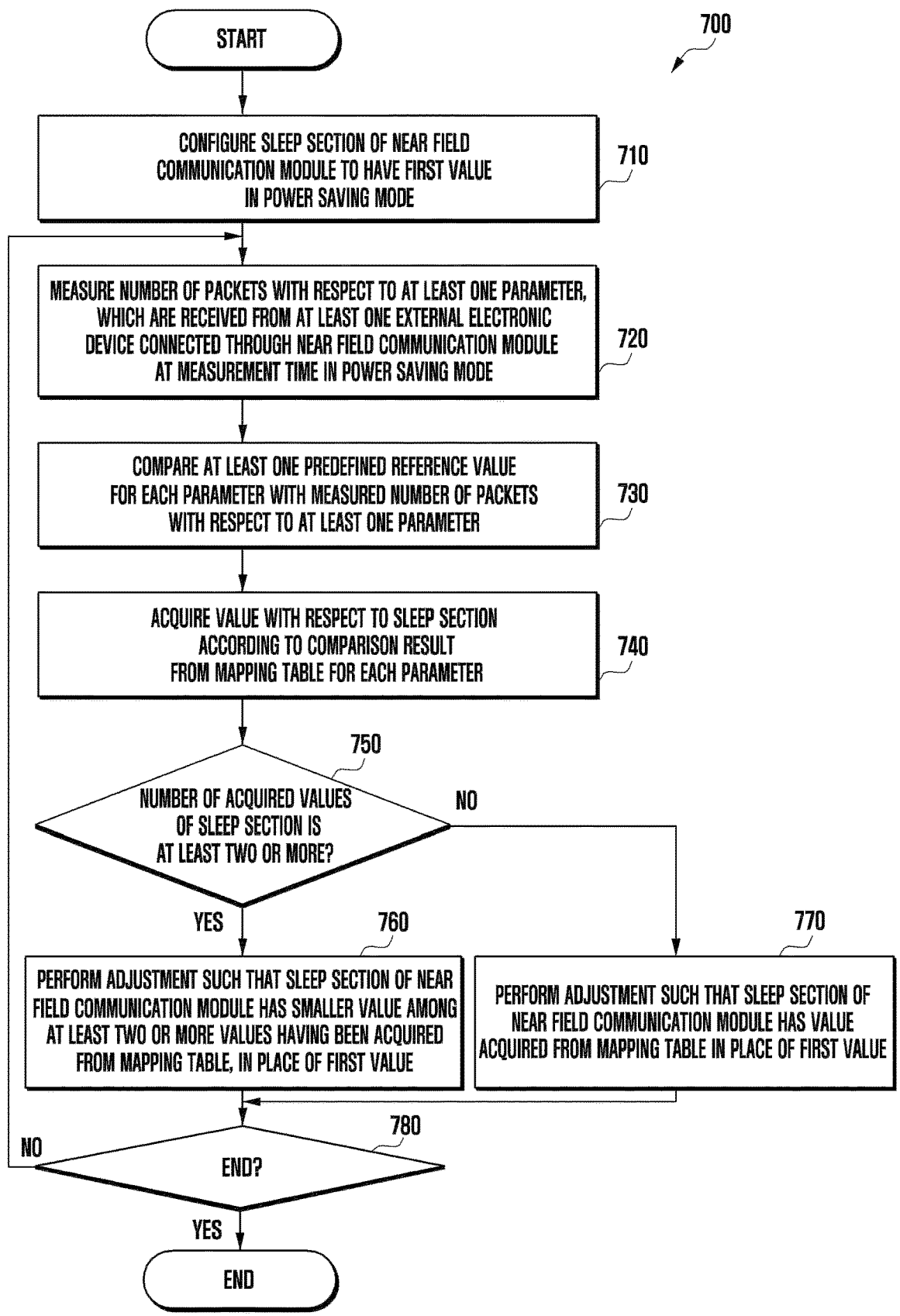
FIG. 7 is a flowchart concretely illustrating a method of adjusting a sleep duration time of a near field communication module of an electronic device, namely operation 620 of FIG. 6, according to various embodiments of the disclosure.

FIG. 7 is a flowchart 700 concretely illustrating a method of adjusting a sleep duration time of a near field communication module of an electronic device, namely operation 620 of FIG. 6, according to various embodiments of the disclosure.

Referring to FIG. 7, in operation 710, a processor (for example, the processor 240 of FIG. 2) may configure a sleep section of a near field communication module (for example, the near field communication module 215 of FIG. 2) to have a first value in a power saving mode.

In one embodiment, the first value is configured to be default, for example, the first value may indicate a sleep duration time of the first sleep section (for example, 543 of FIG. 5) after the near field communication module enters a power saving mode (for example, the power saving mode 540 of FIG. 5).

In one embodiment, in operation 720, the processor may measure the number of packets with respect to at least one parameter, which are received from at least one external electronic device (for example, the electronic device 102 or 104 and the server 108 of FIG. 1) connected to an electronic device (for example, the electronic device 201 of FIG. 2) which operates as a wireless router, at a measurement time in the power saving mode.

In one embodiment, the number of packets with respect to the at least one parameter may include at least one of the number of multicast packets, the number of retransmission packets, the total number of packets, and the number of retransmission packets for each service category.

In one embodiment, in operation 730, the processor may compare at least one predefined reference value for each parameter with the measured number of packets with respect to the at least one parameter.

For example, the processor may determine whether the number of multicast packets received from at least one external electronic device exceeds at least one predefined multicast reference value, whether the number of retransmission packets received from the at least one external electronic device exceeds at least one predefined retransmission reference value, whether the total number of packets transmitted to or received from the at least one external electronic device exceeds at least one predefined total packet reference value, and whether the number of retransmission packets for each service category exceeds the at least one predefined service category reference value.

In one embodiment, in operation 740, the processor may acquire a value with respect to a sleep section according to a result of the comparison from a mapping table (for example, a table to which at least one reference value and a sleep duration time are mapped) for each parameter.

In one embodiment, in operation 750, the processor may determine whether the number of values with respect to a sleep section, which have been acquired from the mapping table, is equal to or greater than two.

In one embodiment, when the number of values with respect to the sleep section, the values having been acquired from the mapping table, is equal to or greater than two, in operation 760, the processor may perform adjustment such that the sleep section of the near field communication module has a smaller value among the at least two or more values having been acquired from the mapping table, in place of the first value.

For example, when the measured number of packets with respect to the at least one parameter is the number of multicast packets and the number of transmission packets among the number of multicast packets, the number of retransmission packets, the total number of packets, and the number of retransmission packets for each service category, the processor may acquire two values with respect to each sleep section from a mapping table with respect to the number of multicast packets and a mapping table with respect to the number of retransmission packets. In one embodiment, when a value with respect to a sleep section acquired from the mapping table with respect to the number of multicast packets is 20 msecs, and a value with respect to a sleep section acquired from the mapping table with respect to the number of retransmission packets is 10 msecs, the processor may set 10 msecs, which is a smaller value among 20 msecs and 10 msecs, as the value with respect to the sleep section.

The embodiment is described assuming that the measured number of packets with respect to the at least one parameter is the number of multicast packets and the number of retransmission packets, but the disclosure is not limited thereto.

For example, at least one parameter to measure the number of packets may be configured (for example, at least one parameter to measure the number of packets may be configured according to the priority) by a user, or may be previously configured to be a default value within an electronic device.

In one embodiment, when the number of values with respect to the sleep section, the values having been acquired from the mapping table, is not equal to or greater than two, in operation 770, the processor may perform adjustment such that the sleep section of the near field communication module has the value acquired from the mapping table in place of the first value.

In one embodiment, in operation 780, the processor may determine whether to end. Whether to end may include whether at least one external electronic device is connected to the electronic device which operates as a wireless router.

In one embodiment, when at least one external electronic device is additionally connected to or at least one previously connected external electronic device is disconnected from the electronic device which operates as a wireless router, the processor may end the operation of the near field communication module in the power saving mode, and may configure the near field communication module to enter a second operation state (for example, the second operation state 520 of FIG. 5) or a third operation state (for example, the third operation state 530 of FIG. 5).

In one embodiment, when it is not detected that at least one external electronic device is additionally connected to or at least one previously connected external electronic device is disconnected from the electronic device which operates as a wireless router, the processor returns to operation 720 and may thus measure the number of packets with respect to at least one parameter, which are received from the at least one external electronic device.

In one embodiment, a scenario according to operations 730 to 770 described above will be described as follows.

In one embodiment, when the measured number of packets with respect to at least one parameter is the number of multicast packets, the processor may compare the number of multicast packets with at least one predefined multicast reference value.

For example, as illustrated in Table 2 below, the at least one predefined multicast reference value may be mapped with a sleep duration time (for example, a value that a sleep section has) and then stored in a memory (for example, the memory 220 of FIG. 2) as a mapping table with respect to RX multicast.

TABLE 2

| RX multicast reference value | Sleep duration time |
| --- | --- |
| a > a first multicast reference value | 0 msec |
| a > a second multicast reference value | 10 msecs |
| a > a third multicast reference value | 20 msecs |
| a > a fourth multicast reference value | 30 msecs |

In one embodiment, the processor may adjust the first value having been set in operation 710 to a second value having been acquired from the mapping table with respect to multicast, based on a result of the comparison between the measured number (a) of multicast packets and the at least one predefined multicast reference value.

For example, assuming that the first value is 25 msecs, when the measured number (a) of multicast packets exceeds a first multicast reference value, the processor may adjust a sleep time of the near field communication module from 25 msecs to 0 msec. When the measured number (a) of multicast packets exceeds a second multicast reference value, the processor may adjust a sleep time of the near field communication module from 25 msecs to 10 msecs. When the measured number (a) of multicast packets exceeds a third multicast reference value, the processor may adjust a sleep time of the near field communication module from 25 msecs to 20 msecs. When the measured number (a) of multicast packets exceeds a fourth multicast reference value, the processor may adjust a sleep time of the near field communication module from 25 msecs to 30 msecs.

In one embodiment, when the measured number of packets with respect to at least one parameter is the number of retransmission packets, the processor may compare the number of retransmission packets with at least one predefined reference value with respect to the number of packets.

For example, as illustrated in Table 3 below, the at least one predefined retransmission reference value may be mapped with a sleep duration time (for example, a value that a sleep section has) and then stored in a memory as a mapping table with respect to RX retransmission.

TABLE 3

| RX retransmission reference value | Sleep duration time |
| --- | --- |
| b > a first retransmission reference value | 0 msec |
| b > a second retransmission reference value | 10 msecs |
| b > a third retransmission reference value | 20 msecs |
| b > a fourth retransmission reference value | 30 msecs |

In one embodiment, the processor may adjust the first value having been set in operation 710 to a second value having been acquired from the mapping table with respect to retransmission, based on a result of the comparison between the measured number (b) of retransmission packets and at least one predefined retransmission reference value.

For example, assuming that the first value is 25 msecs, when the measured number (b) of retransmission packets exceeds a first retransmission reference value, the processor may adjust a sleep time of the near field communication module from 25 msecs to 0 msec. When the measured number (b) of retransmission packets exceeds a second retransmission reference value, the processor may adjust a sleep time of the near field communication module from 25 msecs to 10 msecs. When the measured number (b) of retransmission packets exceeds a third retransmission reference value, the processor may adjust a sleep time of the near field communication module from 25 msecs to 20 msecs. When the measured number (b) of retransmission packets exceeds a fourth retransmission reference value, the processor may adjust a sleep time of the near field communication module from 25 msecs to 30 msecs.

In one embodiment, when the measured number of packets with respect to at least one parameter is the total number of packets, the processor may compare the total number of packets with at least one predefined total reference value.

For example, as illustrated in Table 4 below, the at least one predefined total packet reference value may be mapped with a sleep duration time (for example, a value that a sleep section has) and then stored in a memory as a mapping table with respect to the total packet.

TABLE 4

| Total packet reference value | Sleep duration time |
|---|---|
| c > a first total packet reference value | 0 msec |
| c > a second total packet reference value | 10 msecs |
| c > a third total packet reference value | 20 msecs |
| c > a fourth total packet reference value | 30 msecs |

In one embodiment, the processor may adjust the first value having been set in operation 710 to a second value having been acquired from the mapping table with respect to the total packet, based on a result of the comparison between the measured total number (c) of packets and at least one predefined total packet reference value.

For example, assuming that a first duration time is 25 msecs, when the measured total number (c) of packets exceeds a first total packet reference value, the processor may adjust a sleep time of the near field communication module from 25 msecs to 0 msec. When the measured total number (c) of packets exceeds a second total packet reference value, the processor may adjust a sleep time of the near field communication module from 25 msecs to 10 msecs. When the measured total number (c) of packets exceeds a third total packet reference value, the processor may adjust a sleep time of the near field communication module from 25 msecs to 20 msecs. When the measured total number (c) of packets exceeds a fourth total packet reference value, the processor may adjust a sleep time of the near field communication module from 25 msecs to 30 msecs.

In one embodiment, when the measured number of packets with respect to at least one parameter is the number of retransmission packets for each service category, the processor may compare the number of retransmission packets for each service category with at least one predefined service category reference value.

For example, as illustrated in Table 5 below, the at least one predefined service category reference value may be mapped with a sleep duration time (for example, a value that a sleep section has) and then stored in a memory as a mapping table with respect to a service category.

TABLE 5

| Service category reference value | Sleep duration time |
|---|---|
| d > a first service category reference value | 0 msec |
| d > a second service category reference value | 10 msecs |
| d > a third service category reference value | 20 msecs |
| d > a fourth service category reference value | 30 msecs |

In one embodiment, the processor may adjust the first value having been set in operation 710 to a second value having been acquired from the mapping table with respect to a service category, based on a result of the comparison between the measured number (d) of retransmission packets for each service category and at least one predefined service category reference value.

For example, assuming that the first value is 25 msecs, when the measured number (d) of retransmission packets for each service category exceeds a first service category reference value, the processor may adjust a sleep time of the near field communication module from 25 msecs to 0 msec (for example, may perform adjustment such that a reception (RX) module of the near field communication module is in an on-state in a power saving mode, without a sleep section). When the measured number (d) of retransmission packets for each service category exceeds a second service category reference value, the processor may adjust a sleep time of the near field communication module from 25 msecs to 10 msecs. When the measured number (d) of retransmission packets for each service category exceeds a third service category reference value, the processor may adjust a sleep time of the near field communication module from 25 msecs to 20 msecs. When the measured number (d) of retransmission packets for each service category exceeds a fourth service category reference value, the processor may adjust a sleep time of the near field communication module from 25 msecs to 30 msecs.

In one embodiment, it is recited that, in a mapping table with respect to at least one parameter, such as the mapping table with respect to multicast, the mapping table with respect to retransmission, the mapping table with respect to the total packet, and the mapping table with respect to a service category, a sleep duration time according to at least one reference value is the same, but the disclosure is not limited thereto. A sleep duration time according to the at least one reference value may be different for each parameter.

Figure 8:
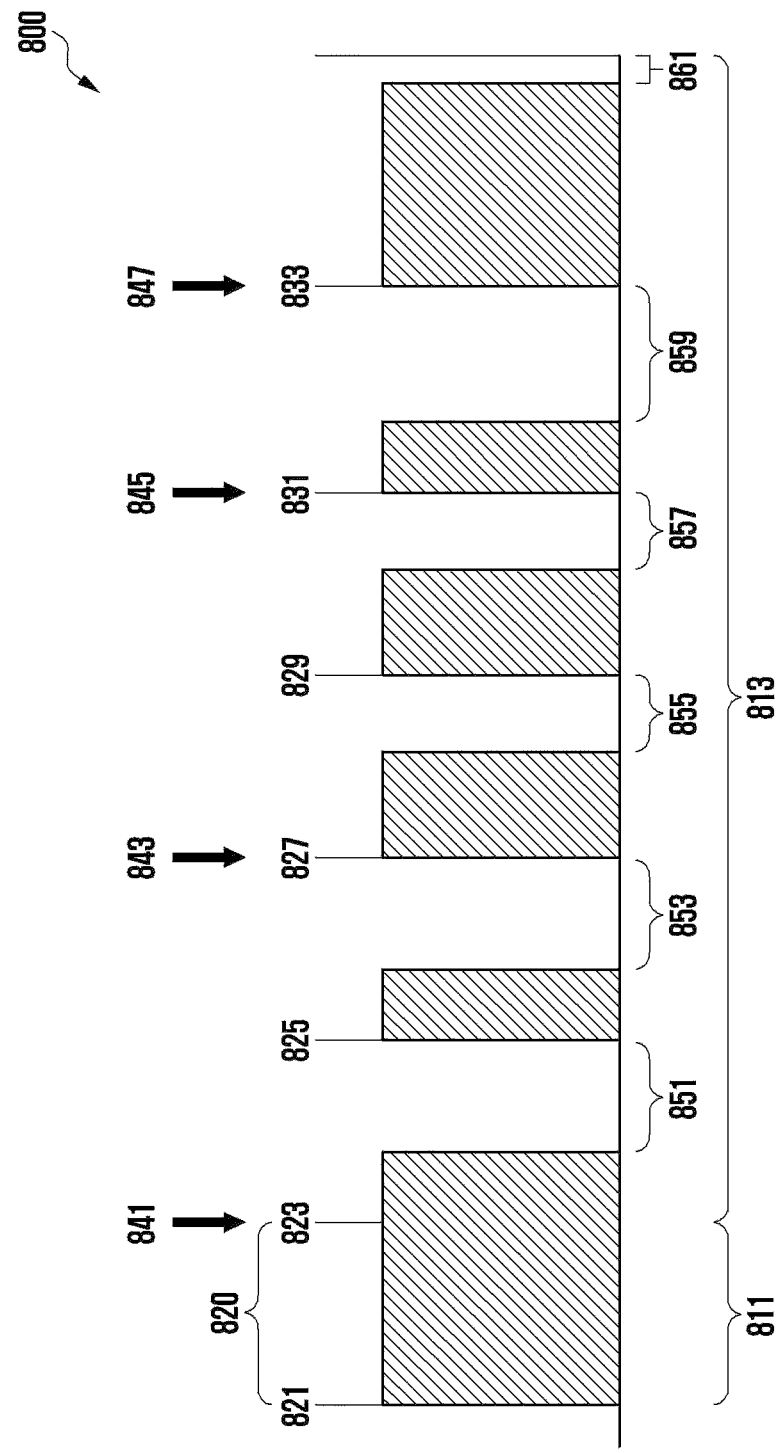
FIG. 8 is a diagram illustrating a method of adjusting a time for which a sleep state of a near field communication module of an electronic device lasts, based on the number of packets received from at least one external electronic device, according to various embodiments of the disclosure.

FIG. 8 is a diagram 800 illustrating a method of adjusting a time for which a sleep state of a near field communication module of an electronic device lasts, based on the number of packets received from at least one external electronic device, according to various embodiments of the disclosure.

In FIG. 8, the number of packets received from at least one external electronic device will be described assuming that the number of packets is at least one of the number of multicast packets and the number of retransmission packets.

Referring to FIG. 8, in an electronic device (for example, the electronic device 201 of FIG. 2) which operates as a wireless router, a processor (for example, the processor 240 of FIG. 2) may transmit a beacon signal (operations 821, 823, 825, 827, 829, 831, and 833) at a predefined time interval 820 in a deactivation section 811 (for example, the deactivation sections 501 and 505 of FIG. 5) and an activation section 813 (for example, the activation section 503 of FIG. 5) of a sleep state while a near field communication module operates in a power saving mode (for example, the power saving mode 540 of FIG. 5).

In one embodiment, when the near field communication module (for example, the near field communication module 215 of FIG. 2) enters a power saving mode, the processor may configure a sleep section of the near field communication module to have a first value 851 or 853 (for example, 25 msecs) (operation 841).

In one embodiment, a processor may monitor a packet transmitting/receiving state with at least one external electronic device (for example, the electronic device 102 or 104 and the server 108 of FIG. 1) connected to an electronic device (for example, the electronic device 201 of FIG. 2) which operates as a wireless router at a time (for example, a time when a beacon signal is transmitted (operations 821, 823, 825, 827, 829, 831, and 833) when the sleep section ends.

For example, the processor may monitor the number of multicast packets and the number of retransmission packets, the packets being received from the at least one connected external electronic device, and measure at least one of the number of multicast packets and the number of retransmission packets.

In one embodiment, the processor may compare at least one of the measured number of multicast packets and the measured number of retransmission packets with at least one of at least one predefined multicast reference value and at least one predefined retransmission reference value.

In one embodiment, the processor may acquire a value, which the sleep section has, corresponding to the at least one predefined retransmission reference value from the mapping table with respect to retransmission when the number of packets such as the number of retransmission packets, which has been measured based on at least a part of a result of the monitoring of a packet receiving state, exceeds at least one predefined retransmission reference value while the near field communication module operates in a sleep state having the first value 851 or 853 (operation 843).

In one embodiment, based on the value that the sleep section has and which corresponds to the at least one retransmission reference value and has been acquired from the mapping table, the processor may perform adjustment such that a sleep duration time of the near field communication module is adjusted to a second value 855 or 857 (for example, 20 msecs) smaller than the acquired first value 851 or 853 (for example, 25 msecs), to a third value 859 (for example, 30 msecs) larger than the first value 851 or 853 (for example, 25 msecs), or to a fourth value 861 (for example, 10 msecs) smaller than the second value 855 or 857 (for example, 20 msecs).

Figure 9:
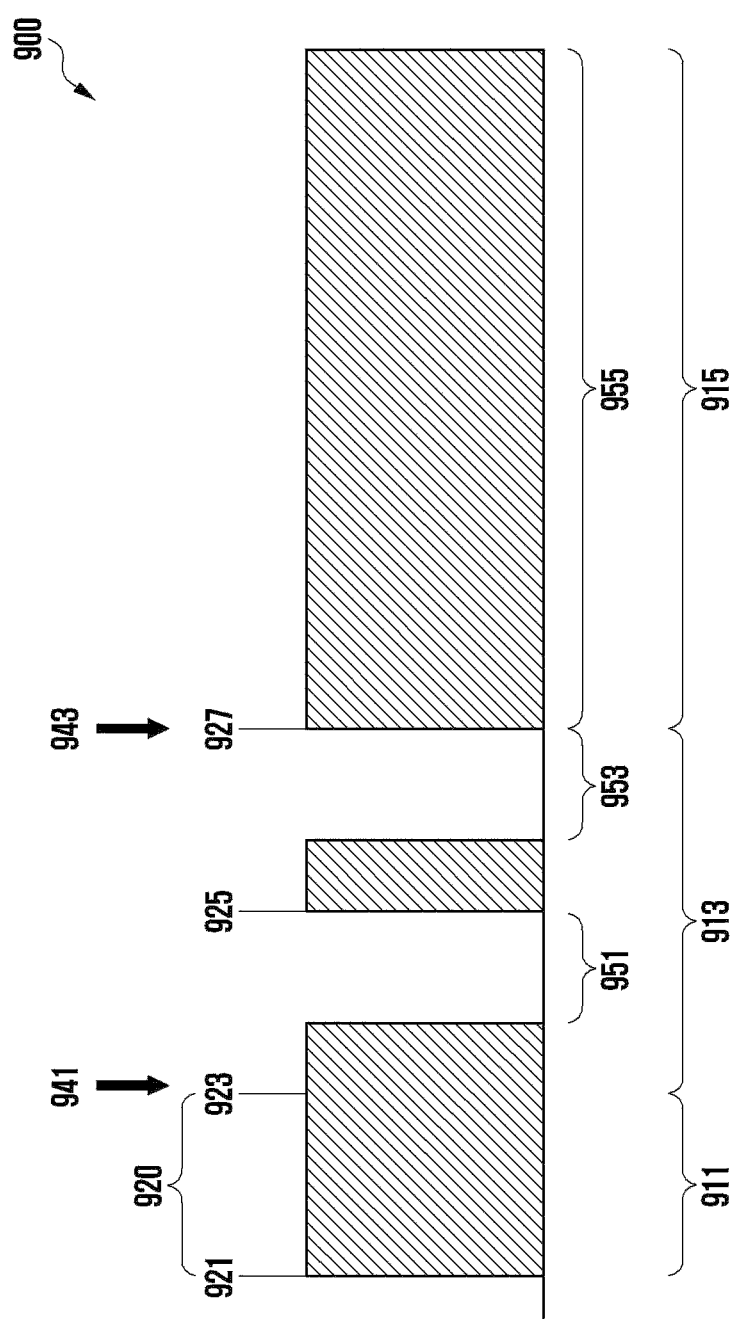
FIG. 9 is a diagram illustrating a method of adjusting a time for which a sleep state of a near field communication module of an electronic device lasts, based on the number of retransmission packets for each service category, according to various embodiments of the disclosure.

FIG. 9 is a diagram 900 illustrating a method of adjusting a time for which a sleep state of a near field communication module of an electronic device lasts, based on the number of retransmission packets for each service category, according to various embodiments of the disclosure.

Referring to FIG. 9, in an electronic device (for example, the electronic device 201 of FIG. 2) which operates as a wireless router, a processor (for example, the processor 240 of FIG. 2) may transmit a beacon signal (operations 921, 923, 925, and 927) at a predefined time interval 920 in deactivation sections 911 and 915 (for example, the deactivation section 811 of FIG. 8) and an activation section 913 (for example, the activation section 813 of FIG. 8) of a sleep state while a near field communication module operates in a power saving mode (for example, the power saving mode 540 of FIG. 5).

In one embodiment, when the near field communication module (for example, the near field communication module 215 of FIG. 2) enters a power saving mode, the processor may configure a sleep section of the near field communication module to have a first value 951 or 953 (for example, 25 msecs) (operation 941).

In one embodiment, the processor may monitor a packet transmitting/receiving state with at least one external electronic device (for example, the electronic device 102 or 104 and the server 108 of FIG. 1) connected to an electronic device (for example, the electronic device 201 of FIG. 2) which operates as a wireless router.

For example, the processor may monitor the number of retransmission packets for each service category, the packets being received from the at least one connected external electronic device, and measure the number of retransmission packets for each service category.

In one embodiment, an operation of monitoring a packet transmitting/receiving state with the at least one connected external electronic device may be performed at a time when a beacon signal is transmitted (operations 921, 923, 925, and 927).

In one embodiment, the processor may determine whether the measured number of retransmission packets for each service category exceeds a specific service category reference value.

For example, as described in Table 5, at least one service category reference value, which is a comparison target of the measured number of retransmission packets for each service category, may have a smaller value according to the order of the first service category reference value, the second service category reference value, the third service category reference value, and the fourth service category reference value. The specific service category reference value may indicate the first service category reference value having the largest value, among the first to fourth service category reference values.

In one embodiment, when the measured number of packets such as the number of retransmission packets for each service category exceeds a specific service category reference value such as the first service category reference value (operation 943), the processor may configure a reception (RX) module of the near field communication module to enter an on-state 955 without a sleep section (for example, the first value is adjusted from 25 msecs to 0 msec.) in a power saving mode of the near field communication module.

For example, in the case of a service category, which performs real-time transmission, such as a voice over internet protocol (VoIP) or a streaming service, when the number of packets exceeds a specific reference value, the processor may perform control such that the near field communication module operates in a power saving mode without a sleep state. As the near field communication module is controlled to operate in a power saving mode without a sleep state, the electronic device can provide a service where uninterrupted real-time transmission is important, such as the VoIP or the streaming service.

In one embodiment, as a sleep state in which the near field communication module operates in a power saving mode is controlled to be on or off according to a service category instead of adjusting a value of a sleep section, differentiated operations may be performed according to service categories. For example, in the case of the service category which performs real-time transmission, such as the VoIP or the streaming service, the processor may perform control such that a sleep state under a power saving mode is on or off, based on a specific reference value. In the case of a service category which does not require real-time transmission, such as a web service, the processor may adjust a value of a sleep section of the near field communication module in the power saving mode, based on at least one predefined reference value.

In one embodiment, a predefined reference value for performing control such that a sleep state under a power saving mode is off for each service category or adjusting a value of a sleep section of the near field communication module may be different.

Figure 10:
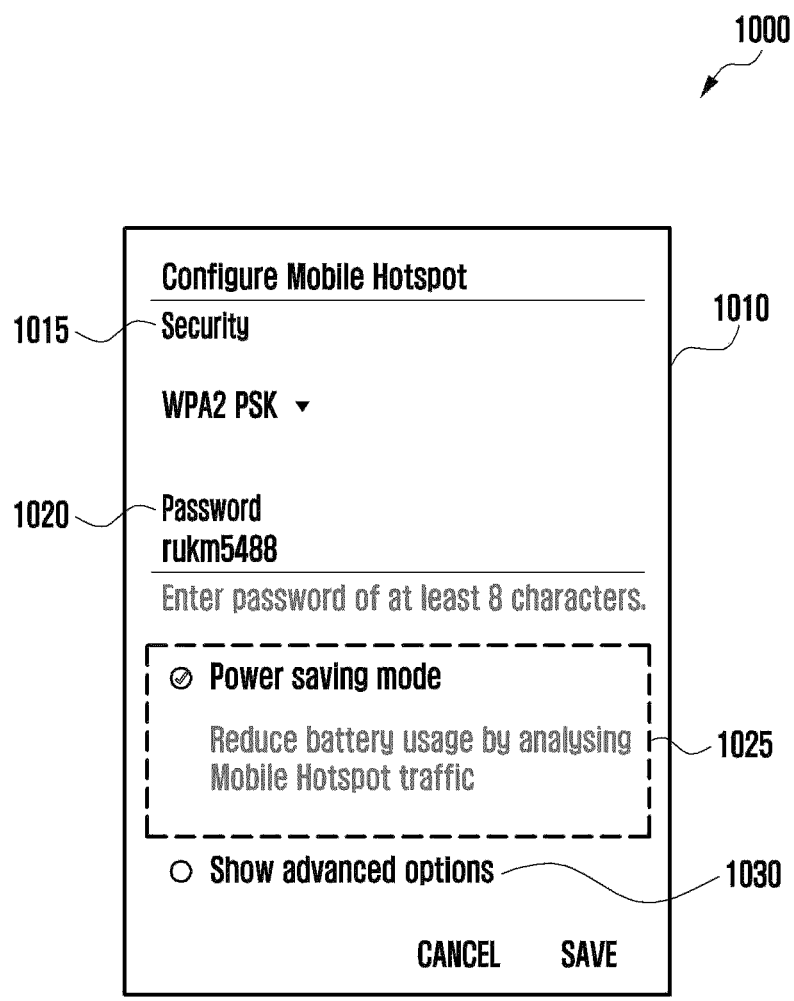
FIG. 10 is a diagram illustrating a method of configuring a mobile hotspot function of an electronic device, according to various embodiments of the disclosure.

FIG. 10 is a diagram 1000 illustrating a method of configuring a mobile hotspot function of an electronic device, according to various embodiments of the disclosure.

Referring to FIG. 10, in an electronic device (for example, the electronic device 201 of FIG. 2), a processor (for example, the processor 240 of FIG. 2) may display a user interface 1010 for configuring a mobile hotspot function on a display (for example, the display unit 231 of FIG. 2).

In one embodiment, the user interface 1010 may include security 1015, a password 1020, a power saving mode option 1025, and/or advanced options (show advanced options) 1030. However, the disclosure is not limited thereto.

In one embodiment, when user input of selecting the power saving mode option 1025 is detected in the user interface 1010, the processor may perform a mobile hotspot function in accordance with operations described in FIGS. 3 to 9.

The electronic device according to certain embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that certain embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to certain embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to certain embodiments, each component (e.g., a module or a program) of the above-described components may include a single entity or multiple entities. According to certain embodiments, one or more of the above-described components may be omitted, or one or more other components may be added. Alternatively or additionally, a plurality of components (e.g., modules or programs) may be integrated into a single component. In such a case, according to certain embodiments, the integrated component may still perform one or more functions of each of the plurality of components in the same or similar manner as they are performed by a corresponding one of the plurality of components before the integration. According to certain embodiments, operations performed by the module, the program, or another component may be carried out sequentially, in parallel, repeatedly, or heuristically, or one or more of the operations may be executed in a different order or omitted, or one or more other operations may be added.

The invention claimed is:
1. An electronic device comprising:
a near field communication module;
a memory; and a processor electrically connected to the near field communication module and the memory, wherein the processor is configured to:

monitor a state of the electronic device which operates as a wireless router and a connection state between the electronic device and at least one external electronic device, when the electronic device operates as a wireless router through the near field communication module;

determine an operation state corresponding to a result of the monitoring among a plurality of predefined operation states related to an operation of the near field communication module;

control the near field communication module so that the near field communication module operates in the determined operation state; and control the near field communication module so that the near field communication module operates in a power saving mode when connection or disconnection of the at least one external electronic device is not detected for a predefined time while the near field communication module operates in the determined operation state.

2. The electronic device of claim 1, wherein the plurality of predefined operation states includes a first operation state, a second operation state, and a third operation state, and wherein the processor is configured to control the near field communication module so that the near field communication module operates in the first operation state, based on at least a part of the monitoring result, when the electronic device is connected to a power source.

3. The electronic device of claim 2, wherein the processor is configured to:

control the near field communication module so that the near field communication module operates in the second operation state at a time when the electronic device is disconnected from the power source in the first operation state, based on the at least a part of the monitoring result, when the at least one external electronic device is not connected to the electronic device which operates as the wireless router; and control the near field communication module so that the near field communication module to operates in the third operation state at the time when the electronic device is disconnected from the power source in the first operation state, based on the at least a part of the monitoring result, when the at least one external electronic device is connected to the electronic device which operates as the wireless router.

4. The electronic device of claim 3, wherein the processor is configured to:

control the near field communication module so that the near field communication module to operates in the power saving mode, based on the at least a part of the monitoring result, when connection between the at least one external electronic device and the electronic device which operates as a wireless router is not detected for the predefined time in the second operation state;

control the near field communication module so that the near field communication module to operates in the third operation state, based on the at least a part of the monitoring result, when the at least one external electronic device is connected to the electronic device which operates as a wireless router for the predefined time in the second operation state; and control the near field communication module so that the near field communication module to operates in the first operation state, based on the at least a part of the monitoring result, when the electronic device which operates as a wireless router is connected to the power source for the predefined time in the second operation state.

5. The electronic device of claim 4, wherein the processor is configured to:

control the near field communication module so that the near field communication module operates in the second operation state, based on the at least a part of the monitoring result, when all of the at least one external electronic devices is disconnected from the electronic device which operates as a wireless router for the predefined time in the third operation state;

control the near field communication module so that the near field communication module operates in the power saving mode, based on the at least a part of the monitoring result, when the at least one external electronic device is not additionally connected to or disconnected from the electronic device which operates as a wireless router for the predefined time, or a number of the at least one external electronic devices connected to the electronic device corresponds to a number of predefined connectable external electronic devices in the third operation state; and control the near field communication module so that the near field communication module operates in the first operation state, based on the at least a part of the monitoring result, when the electronic device is connected to the power source for the predefined time in the third operation state.

6. The electronic device of claim 5, wherein the processor is configured to:

control the near field communication module so that the near field communication module operates in the second operation state, based on the at least a part of the monitoring result, when all of the at least one external electronic devices is disconnected from the electronic device which operates as a wireless router in the power saving mode;

control the near field communication module so that the near field communication module operates in the third operation state, based on the at least a part of the monitoring result, when the at least one external electronic device is connected to or the connected at least one external electronic device is disconnected from the electronic device which operates as a wireless router in the power saving mode; and control the near field communication module so that the near field communication module operates in the first operation state, based on the at least a part of the monitoring result, when the electronic device is connected to the power source in the power saving mode.

7. The electronic device of claim 1, wherein the processor is configured to:

monitor a packet transmitting/receiving state with the at least one external electronic device connected to the electronic device which operates as a wireless router in the power saving mode; and adjust a time for which a sleep state of the near field communication module lasts in the power saving mode, based on at least a part of a result of the monitoring of the packet transmitting/receiving state.

8. The electronic device of claim 7, wherein the processor is configured to:

configure a sleep section of the near field communication module to have a first value in the power saving mode, and measure a number of packets with respect to at least one parameter, the packets being received from the at least one connected external electronic device;
compare the measured number of packets with respect to the at least one parameter with at least one predefined reference value for each of the parameters;
acquire a value with respect to the sleep section of the near field communication module according to a result of the comparison from a mapping table with respect to each of the parameters stored in the memory; and
perform adjustment such that the sleep section of the near field communication module has the value having been acquired from the mapping table in place of the first value,
wherein the number of packets with respect to the at least one parameter includes at least one of a number of multicast packets, a number of retransmission packets, a total number of packets, or a number of retransmission packets for each service category.

9. The electronic device of claim 8, wherein the processor is configured to perform adjustment such that the sleep section of the near field communication module has a smaller value among at least two or more values having been acquired from the mapping table, in place of the first value, when a number of the acquired values with respect to the sleep section of the near field communication module is equal to or greater than two.

10. The electronic device of claim 8, wherein the processor is configured to perform control such that a reception module of the near field communication module is on, based on the comparison result, when the measured number of packets with respect to the at least one parameter exceeds a specific reference value.

11. The electronic device of claim 1, wherein the near field communication module is configured to support a mobile hotspot.

12. A method for reducing current consumption of an electronic device in near field wireless communication, the method comprising:
monitoring a state of the electronic device which operates as a wireless router and a connection state between the electronic device and at least one external electronic device, when the electronic device operates as a wireless router through a near field communication module;
determining an operation state corresponding to a result of the monitoring among a plurality of predefined operation states related to an operation of the near field communication module;
controlling the near field communication module so that the near field communication module operates in the determined operation state; and
controlling the near field communication module so that the near field communication module operates in a power saving mode when connection or disconnection of the at least one external electronic device is not detected for a predefined time while the near field communication module operates in the determined operation state.

13. The method of claim 12, wherein the plurality of predefined operation states of the near field communication module includes a first operation state, a second operation state, and a third operation state, and
wherein the controlling the near field communication module so that the near field communication module operates in the determined operation state comprises controlling the near field communication module so that the near field communication module operates in the first operation state, based on at least a part of the monitoring result, when the electronic device is connected to a power source.

14. The method of claim 13, wherein the controlling the near field communication module so that the near field communication module operates in the determined operation state comprises at least one of:
controlling the near field communication module so that the near field communication module operates in the second operation state, based on the at least a part of the monitoring result, when the at least one external electronic device is not connected to the electronic device which operates as a wireless router at a time when the electronic device is disconnected from the power source in the first operation state;
controlling the near field communication module so that the near field communication module operates in the power saving mode, based on the at least a part of the monitoring result, when connection between the at least one external electronic device and the electronic device which operates as a wireless router is not detected for the predefined time in the second operation state;
controlling the near field communication module so that the near field communication module operates in the third operation state, based on the at least a part of the monitoring result, when the at least one external electronic device is connected to the electronic device which operates as a wireless router at the time when the electronic device is disconnected from the power source in the first operation state; and
controlling the near field communication module so that the near field communication module operates in the power saving mode, based on the at least a part of the monitoring result, when the at least one external electronic device is not additionally connected to or disconnected from the electronic device which operates as a wireless router for the predefined time in the third operation state or a number of the external electronic devices connected to the electronic device corresponds to a number of predefined connectable external electronic devices.

15. The method of claim 12, further comprising:
monitoring a packet transmitting/receiving state with the at least one external electronic device connected to the electronic device which operates as the wireless router, in the power saving mode; and
adjusting a period of a sleep state of the near field communication module in the power saving mode, based on at least a part of a result of the monitoring of the packet transmitting/receiving state.

* * * * *